(No Model.)
E. WAGNER.
FAUCET.
No. 531,985.  Patented Jan. 1, 1895.
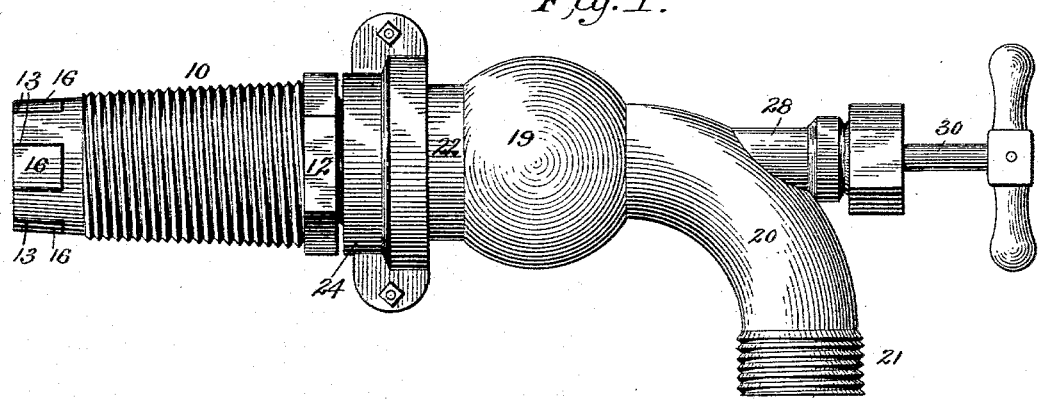
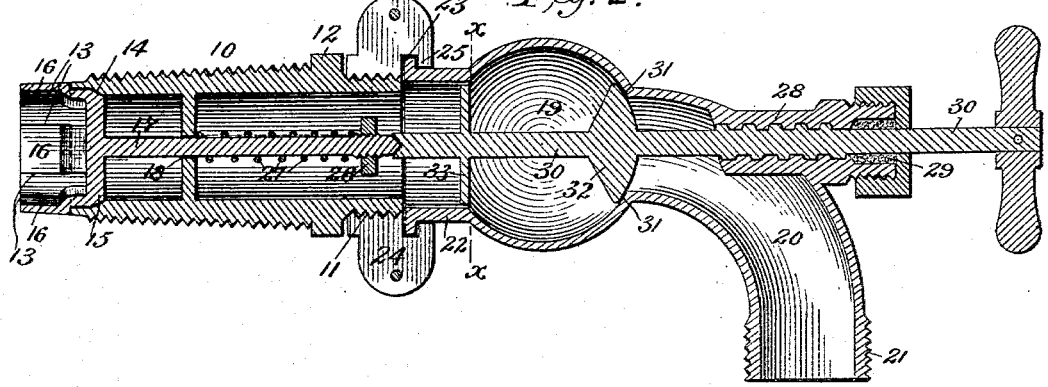
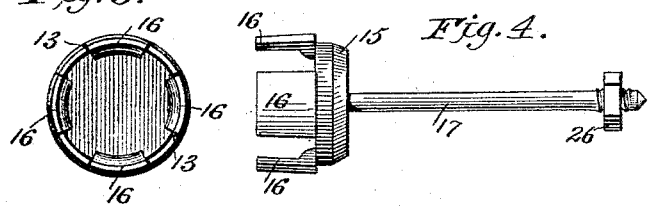
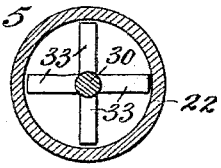
WITNESSES:
INVENTOR
Edward Wagner.
BY
ATTORNEYS

UNITED STATES PATENT OFFICE.

EDWARD WAGNER, OF ST. LOUIS, MISSOURI, ASSIGNOR OF ONE-HALF TO HUGO KOEHLER, OF SAME PLACE.

FAUCET.

SPECIFICATION forming part of Letters Patent No. 531,985, dated January 1, 1895.

Application filed May 25, 1891. Serial No. 394,082. (No model.)

*To all whom it may concern:*

Be it known that I, EDWARD WAGNER, a citizen of the United States, residing at the city of St. Louis, in the State of Missouri, have invented new and useful Improvements in Faucets, of which the following is a specification.

My invention relates to that class of faucets which are combined with a hollow plug, externally screw threaded so as to screw into a cask or barrel, its outer end provided with a nipple externally threaded to engage with the internal screw threads of a coupling ring arranged to be held on, and to rotate around the inner end of the faucet shell, such plug being provided with a valve and stem, automatically closed by a spring, and the faucet shell with a longitudinal screw-threaded rod to operate against said valve stem for the purpose of opening the valve.

My invention consists in forming a valve seat within such class of faucet at the junction of its shell with its discharge spout, and forming upon such longitudinal screw threaded rod, a valve to operate in such valve seat, and other details of construction which will be hereinafter pointed out.

This invention is illustrated in the accompanying drawings, in which—

Figure 1 is a side view of the faucet and plug combined. Fig. 2 is a view of a longitudinal section of the same. Fig. 3 is a plan view of the inner end of the plug and its valve. Fig. 4 is a side view of the plug valve, its arms and stem, and Fig. 5 is a view in cross section of the faucet on the line *x—x* of Fig. 2, also showing a cross section of the longitudinal screw threaded rod with its guide arms attached.

Similar figures of reference refer to similar parts throughout the several views.

10 is a hollow plug externally screw threaded so as to screw directly into the cask or barrel, provided at its outer end with an externally screw threaded nipple 11 and between such nipple and the threaded portion of the plug, is a nut 12 by means of which a wrench may be used for screwing the plug into the cask or barrel. The inner end of the plug is provided with longitudinal openings 13, in form rectangular, for the passage of the liquid, and which openings also act as guides for the valve arms. Within the interior of the plug and back of, and adjacent to said openings, is formed a beveled valve seat 14. The beveled valve 15 is seated in the valve seat of said plug, and such valve is provided with arms 16 extending horizontally from its rim, such arms being arranged to fit neatly in the openings 13, and such valve is also provided with a stem 17 which extends through a guide 18 in the interior of such plug.

The faucet consists of a globular shell 19 from which extends a discharge spout 20, the end of which is externally threaded as at 21 for the purpose of connecting with a hose. At the opposite side of the globular shell is a cylindrical extension of such shell as at 22 the end of which is provided with a flange 23. The cylindrical extension of the shell is provided with an internally screw threaded coupling ring 24 adapted to engage with the screw threaded nipple 11 of the plug, such coupling ring being formed with an annular flange 25 that fits against the flange 23.

The outer end of the valve stem of the plug is screw threaded to receive a nut 26 and upon such stem between said nut and guide 18 is a spiral spring 27 for closing said valve.

The discharge spout is provided with a horizontal tubular extension 28 the axis of which is in line with that of the shell and with that of the valve stem 17, when the shell is secured to or coupled to the plug. In the outer end of this tubular extension is formed a stuffing box 29 and the remaining portion of such extension is internally screw threaded to engage with and constitute a bearing for the screw rod 30 which is provided with a handle by means of which it can be screwed in or out. The inner end of the rod 30, when the shell is coupled to the plug, abuts against the outer end of the valve stem 17, and by turning or screwing said rod 30 inward the plug valve 15 is opened.

The junction of the globular shell with the discharge spout forms a valve seating as at 31. I form upon the rod 30 an oval shaped valve arranged to operate upon such seat, which valve is shown at 32, and by means of turning such rod in opposite directions such valve may be opened or closed. I also provide the rod with guide arms 33 the outer ends of the arms sliding or moving against the interior of the cylindrical extension of the shell, retaining such rod 30 in line with the valve stem 17.

It will be seen that the valve 32 acts simultaneously with the plug valve 15, either in opening or closing, when the shell is coupled to the plug and such valves operated by said rod 30. When hose is attached to the faucet, and it is desired to couple the shell to another plug in another cask, the valve 32 may be closed, so that the liquid in the hose may be retained after such shell has been uncoupled from the former plug.

I am aware that it is not new to construct a hollow plug, externally screw threaded, its outer end arranged to be coupled to the inner end of the faucet shell by means of a coupling ring, to provide the inner end of the plug with a valve having a stem extending in the interior of the plug, such valve arranged to be automatically closed by a spring, and to provide a longitudinal screw threaded rod extending through the faucet shell, its inner end abutting the outer end of the plug valve stem, the outer end of such rod passing through a tubular extension at the outer end of the faucet shell internally screw threaded to engage with and constitute a bearing for such screw rod. Such construction is described in Letters Patent No. 243,340, issued to Albert Zoller, June 21, 1881. Faucets of this character are extensively used in breweries where they are coupled with hose, the opposite end of the latter being provided with a stop cock, the device being used for conveying beer from a vessel located in an upper story to another vessel in a lower story, frequent changes of vessels being made, requiring the uncoupling of the faucet from the stationary plug in the vessel, and a serious objection to said patented faucet is that when so uncoupled, great loss is sustained, by reason of the beer or other fluid in the hose escaping through said faucet.

I am also aware that in a gage cock, it has been proposed to construct a shell permanently placed in the boiler, provided with a valve and stem, and to attach to this, another shell provided with a discharge spout, and at the inner end of such shell to provide a valve seating adapted to receive a valve attached to the end of a threaded rod, extending through such shell, which latter valve and rod are adapted to operate against the valve and stem in the shell secured in the boiler. Such construction is described in Letters Patent to Casey, dated April 29, 1884, No. 297,569. If this device could be adopted for use as a faucet, the location of the valve at the end of the removable shell is objectionable, because in use, such valve is liable to be struck by other objects and bent, displaced, or broken off from the screw rod, and in operating it by causing it to come in contact with said stem in the other shell, it is liable to be bent or displaced so as not to make a sufficiently tight joint when in its seating. I have obviated these objections by constructing a removable shell or discharge spout provided with a valve within the interior of the shell, which is secured to the screw rod, and which does not come in contact with the valve stem in the plug or shell secured in the vessel, thus preventing wastage of beer or other liquid when in the hose, and the faucet uncoupled, and also rendering it impossible to injure or displace such valve in said faucet.

What I claim as new, and desire to secure by Letters Patent, is—

In a faucet, the combination of the hollow plug formed at its inner end with a number of openings 13, a valve located within said plug and adapted to be held to its seat by means of a spring, arms 16 formed on said valve, said arms being adapted to fit and be guided in the openings 13, a shell provided with discharge spout connected with said plug, a valve located within said shell, and a stem controlling said valve and the valve in the hollow plug, substantially as shown and described.

EDWARD WAGNER.

Witnesses:
F. CLAUSEN,
HENRY KOEHLER, Jr.